UNITED STATES PATENT OFFICE.

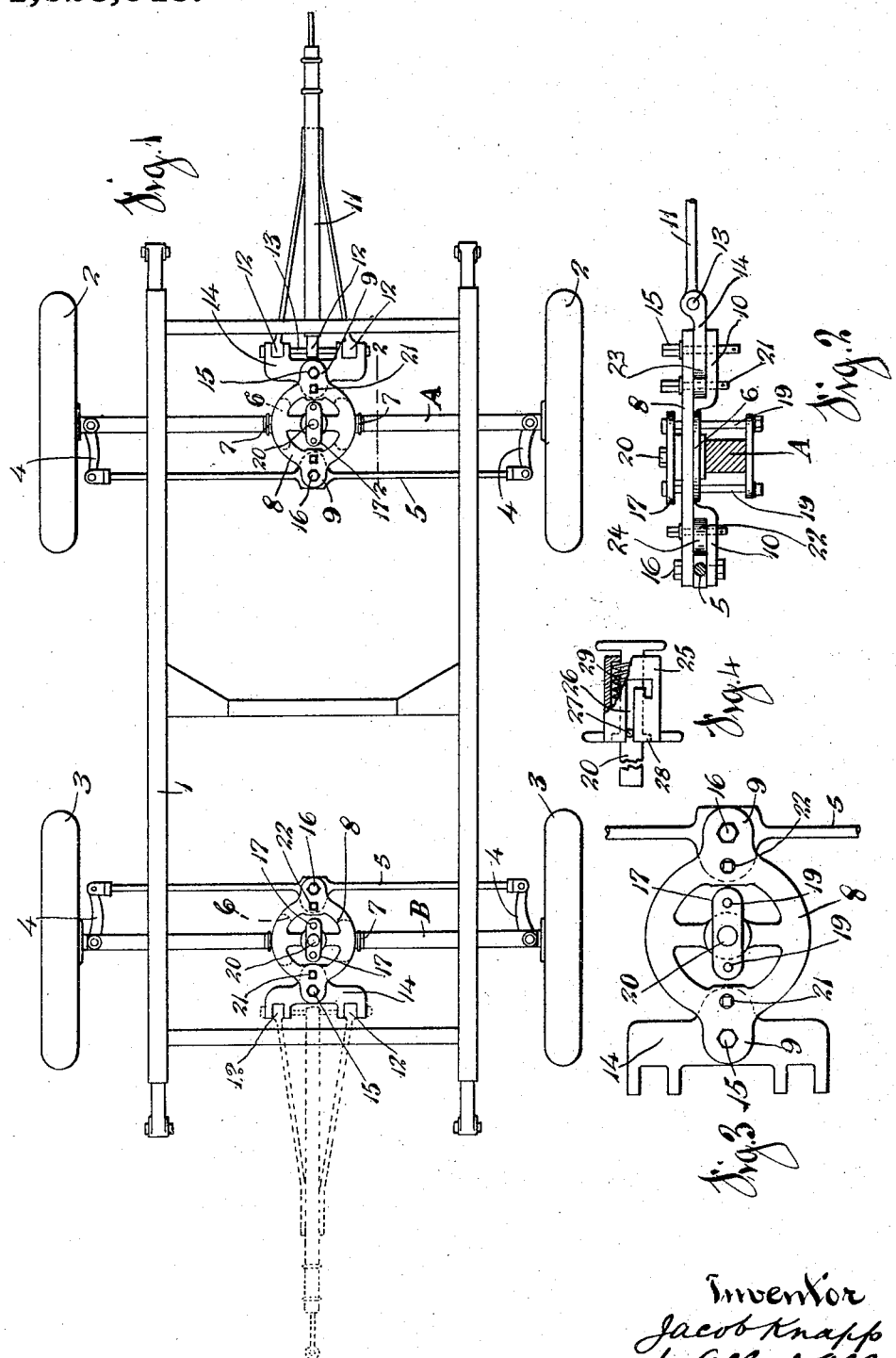

JACOB KNAPP, OF CINCINNATI, OHIO, ASSIGNOR TO THE SECHLER & COMPANY, OF CINCINNATI, OHIO, A CORPORATION OF OHIO.

TRAILER-VEHICLE.

1,328,048.  Specification of Letters Patent.  Patented Jan. 13, 1920.

Application filed July 27, 1917. Serial No. 183,069.

*To all whom it may concern:*

Be it known that I, JACOB KNAPP, a citizen of the United States, and a resident of the city of Cincinnati, in the county of Hamilton and State of Ohio, have invented certain new and useful Improvements in Trailer-Vehicles, of which the following is a full, clear, and exact description, reference being had to the accompanying drawings, forming part of this specification.

My invention relates to trailer vehicles, and has as its object the provision of a fifth wheel device which is adapted for use on front and rear wheels, and can be used for steering the trailer backward when it is being pushed rearwardly by a tractor vehicle from the front.

It has been the greatest difficulty of the trailer art to provide a simple and convenient means whereby the trailer could be backed, without disconnecting it from the tractor vehicle and pulling it backward, instead of pushing it backward. In many instances it is impossible to get around to the rear of a trailer in order to pull it out of a hole, and a trailer becomes hopelessly out of commission if it gets ditched in a narrow roadway, or the like.

It is the object of my invention to provide for a fifth wheel device in connection with trailers which adapts itself to the backing of a trailer by pushing it rearwardly and steering it from the rear, after making a few simple adjustments.

This object I accomplish by that certain construction and arrangement of parts to be hereinafter more specifically pointed out and claimed.

In the drawings,

Figure 1 is a top plan view of the device.

Fig. 2 is a side elevation of one of the fifth wheel devices, from a section on the line 2, 2, of Fig. 1.

Fig. 3 is a top plan view of one of the fifth wheel devices, on a larger scale than Fig. 1.

Fig. 4 is a side elevation, partly broken away, of one of the pin socket pieces to be used for all removable pins if desired.

The trailer as shown has a frame 1, front wheels 2, 2, and rear wheels 3, 3. Both the front and rear wheels have pivot axles and are controlled by steering knuckle arms 4, 4, said arms being connected across the frame so as to operate together by means of a steering connecting rod 5.

Mounted, in this instance, on the front and rear axles A and B of the trailer, are bearing plates 6, 6, for the fifth wheel devices. These plates may be of any desired design suitable to give a bearing to the fifth wheel plate, and they are suitably clamped to the cross member of the vehicle frame as at 7, 7.

The fifth wheel plate comprises a circular cut-out plate 8 having ears 9, 9, set opposite each other for making the operative connections. Extending on the under side of the plate are the angle portions 10, 10, which form with the ears 9, bifurcated coupling members for the draw bar coupling plate and the steering connecting rod.

The draw bar 11 terminates at the trailer end, preferably in three alined knuckles 12, 12, 12, which are engaged by the coupling bolt 13 to couple the draw bar to the plate 14. The plate 14 is in turn swiveled to the fifth wheel plate by means of a vertical pin 15.

At the inner side of the fifth wheel plate the connection to the steering rod is made by means of a pin 16. The distance from the center of the fifth wheel device (to be described) to the pivot pin 16 must correspond to the radius upon which the connecting rod travels at the pivot point for this pin. Thus if the connecting rod is parallel to the axle, the said distance will be equal to the radius upon which the arms 4, 4, move. If the above were not the case, the attempt to steer the wheels from the draw bar would result in the blocking of the fifth wheel device due to the fact that the connection to the rod 5 is a non-sliding one.

The fifth wheel is mounted on the bearing plate 6, preferably with a central boss on the bearing plate engaging in a socket in the under side of the fifth wheel and the construction is held together by a plate 17 extending across over the fifth wheel and held by bolts 19, 19. Extending through the plate or strap 17, and down through the fifth wheel, is a king bolt 20 on which the fifth wheel pivots. The strap 17 serves merely to hold it down.

The fifth wheel is provided with apertures at the inner sides of the ears 9, 9, for removable pins 21, 22, which when inserted or removed, provide for the various steering operations and the locking of the same. These pins pass through extensions on the draw bar coupling plate 14 and the steering connecting rod as at 23 and 24 respectively. When the pin 21 is depressed or inserted so as to engage the draw bar plate 14, the swiveled connnection 15 is destroyed and the draw bar will work rigidly with the fifth wheel device. When the pin 22 engages the connecting rod at 24, then the fifth wheel device and the connecting rod are locked fast against any movement since the pivotal connection of the rod to the plate is destroyed.

Instead of the removable pins at 21, 22, these pins can be made fast to the device, and used as spring pins with a bayonet slot to hold them up in raised position out of their depressed or pivot locking position. Thus as shown in Fig. 4, housings 25 are mounted on the plate 17, carrying slidably in them the pins 21, 22. The housings are provided with a slot 26 of inverted L-shape, in which slot rides a stud 27 on the pins. The pins have a plunger 28 within the housing against which presses the spring 29. This spring will hold the pin fast in either the long or short branch of the housing.

The above described structure is more expensive than an ordinary pin, with a cotter pin to hold it, but presents the advantage of being permanently in place and easy to operate quickly in an emergency.

I have found it desirable to swivel the draw bar to the fifth wheel construction for use in backing, since a trailer will not ordinarily steer backward without much "jockeying," and then only to a limited amount because the front wheels of a trailer, when of the steering type equipped with a fifth wheel, will follow the center of the rear of the tractor vehicle frame. When it is remembered that to back a vehicle, the front wheels must be turned at a considerable angle in the opposite direction from which it is intended to steer the vehicle, it can easily be understood that the backing of a tractor vehicle will not result in a backing of the trailer in the correct direction behind it.

Therefore in this construction, the plan is to provide for a pivotal connection of the front draw bar to the trailer when backing, and thus permitting the application of force to the trailer vehicle from the front while steering from behind by hand, using an additional draw bar for this purpose. So far as I am informed, this has hitherto been unprovided for in the art, and I provide it by my construction above described which operates as follows:

To steer the vehicle forward, it is desirable that the rear wheels be locked so that they will not turn. To do this, the pin 22 is inserted through the fifth wheel and the securing tongue of the connecting rod 5 at the rear. This prevents the rotation of the said rod on the connection at 16, and thus locks the wheels against turning movement.

Since the load of the trailer and its traction on the road will hold the joint made by the pin 15 at the front with the draw bar coupling plate against flexing and permit of steering the vehicle by means of the draw bar at the front without inserting the pin 21 at this point, it will not be absolutely essential to insert the pin 21 to lock the swivel of the plate. Ordinarily, however, the pin 21 at the front of the trailer will be dropped to lock the swiveled joint to the draw bar coupling plate.

For steering the trailer backward, an additional draw bar is provided having also one of the coupling plates. This draw bar is connected up to the rear fifth wheel device and the pin 21 at the rear dropped down to lock the swiveled joint. An operator by turning the draw bar by hand can then steer the rear wheels. At the front the pin 21 must be withdrawn so that the tractor vehicle can turn at the rear without affecting the front wheels and the pin 22 is dropped into place at the front to lock the front wheel against turning.

It can be seen that the trailer can then be steered out of any sort of bad situation without getting the tractor vehicle into unnecessary difficulties itself. The tractor merely pushes on the trailer and does not affect the steering thereof appreciably, if the movement is not long continued. Should the trailer run into a ditch, it can be backed out the way it came in by the above method of operation.

It should not be understood that the above is the only sort of fifth wheel mechanism which could be adapted to use with my invention, as, on the contrary, any sort of such device could as readily be arranged for the same purpose without departing from the spirit thereof. By the above detailed description of parts, I therefore do not wish to limit myself to the exclusion of other equivalent fifth wheel devices or merely mechanical expedients.

Having thus described my invention, what I claim as new and desire to secure by Letters Patent, is:—

1. In a trailer, the combination with the frame and front and rear axles, with carrying wheels swiveled on both axles, and connecting rods for each set of wheels, of a fifth wheel construction for both front and rear axles comprising in each instance a bearing plate on the axle, a fifth wheel plate pivotally mounted thereon, with pivotal connection at the inner end with its respective connecting rod, a member with vertical pivotal connection therefor to the fifth wheel plate and bolts for locking the pivotal connection of the fifth wheel plate with said connecting rod and member, and a drawbar having a horizontal pivotal connection with the member.

2. In a trailer, the combination with the frame and front and rear axles, with carrying wheels swiveled on both axles, and connecting rods for each set of wheels, of a fifth wheel construction for both front and rear axles comprising in each instance a bearing plate on the axle, a fifth wheel plate pivotally mounted thereon, with pivotal connection at the inner ends with its respective connecting rods, and a drawbar with horizontal pivotal connection to the coupling plate, with bolts for locking the coupling plate and the connecting rod to the fifth wheel plate.

3. In a device of the character described, the combination with a steering connecting rod and a drawbar, of a fifth wheel plate comprising in part a pair of opposed extending ears, each having therein vertical pivoting means, and a locking means for the pivot, one of said ears being for connection with the connecting rod and the other of said ears being for connection with a drawbar.

4. In a device of the character described, the combination with a steering connecting rod and a drawbar, of a fifth wheel plate comprising in part a pair of opposed extending ears, each having therein vertical pivoting means, and a locking means for the pivot, one of said ears being for connection with the connecting rod and the other of said ears being for connection with a drawbar, and said drawbar having horizontal pivotal means therein located beyond said pivotal connection with the fifth wheel.

JACOB KNAPP.